US007286041B2

(12) United States Patent
Enrico

(10) Patent No.: US 7,286,041 B2

(45) Date of Patent: Oct. 23, 2007

(54) MAINTENANCE OF AN ANTICOLLISION CHANNEL IN AN ELECTRONIC IDENTIFICATION SYSTEM

(75) Inventor: Marc Enrico, Marseilles (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 11/063,262

(22) Filed: Feb. 22, 2005

(65) Prior Publication Data

US 2005/0231326 A1 Oct. 20, 2005

Related U.S. Application Data

(63) Continuation of application No. 09/889,659, filed on Jul. 18, 2001, now abandoned.

(51) Int. Cl.
*H04Q 5/22* (2006.01)

(52) U.S. Cl. .................... 340/10.2; 340/10.3; 340/10.5

(58) Field of Classification Search ............... 340/10.1, 340/10.3, 10.5

See application file for complete search history.

(56) References Cited

FOREIGN PATENT DOCUMENTS

| | | |
|---|---|---|
| EP | 0585132 A1 * | 3/1994 |
| WO | WO 98/52142 * | 11/1998 |

* cited by examiner

*Primary Examiner*—Brian Zimmerman
*Assistant Examiner*—Nam Nguyen
(74) *Attorney, Agent, or Firm*—Buchanan Ingersoll & Rooney PC

(57) ABSTRACT

Transponders in a system execute commands issued by an interrogator. The interrogator sends out interrogation signals, and a transponder answers with a start signal. The interrogator then modifies its interrogation signal and this causes the answering transponder to send an identification signal and the other transponders to be silent for a time period. The interrogator subsequently sends a second modification of the interrogation signal and a command which causes the other transponders to remain silent for a period of time, and the answering transponder to execute the command. Repeated modified interrogation signals and additional commands can be sent so that the other transponders remain silent while the answering transponder executes the commands. After a certain time following the last modified interrogation signal and executed command, the transponders return to the non-silent state. Time is measured by local counters in each transponder.

18 Claims, 5 Drawing Sheets

MAINTENANCE OF AN ANTICOLLISION CHANNEL IN AN ELECTRONIC IDENTIFICATION SYSTEM

This is a continuation of application Ser. No. 09/889,659 filed Jul. 18, 2001, now abandoned.

The present invention relates to a system of communication between a sending/receiving interrogator unit and a plurality of transponders.

The present invention also relates to a method of operation of such a communication system.

The present invention applies to any radiofrequency communication system but also to any contactless communication system such as infrared, that is to say any system not requiring a physical interconnection of the communication units.

In such systems, the interrogator unit sends signals according to an established protocol to the transponders in order to interrogate them. The interrogator unit is also able to read and interpret the content of the transponders.

A transponder is constituted by a transceiver associated with an item which has to be identified such as a vehicle, a warehouse article, a human being or some other item, and replying automatically to an external interrogation signal coming from the interrogator unit.

A transponder generally has a microcircuit connected to a coil forming an antenna.

The interrogator unit is generally constituted by a system operating by radiofrequency.

In the state of the art, there are many identification systems having an interrogator unit and a plurality of transponders.

The main problem associated with these identification systems lies in the collision between a number of identification signals coming from different transponders. This is because it is possible for a transponder sending an identification signal to the interrogator to be interrupted by the sending of another identification signal from another transponder, which adversely affects the recognition of each transponder.

A number of anticollision systems associated with these communication systems have been proposed in the prior art.

These anticollision systems are generally difficult to implement, and they are often complex to use and of high cost.

Solutions for remedying these drawbacks have been proposed in the state of the art. Thus, European patent EP-A 0 585 132 describes an anticollision system associated with a communication system which is much simpler to implement.

This patent explains two principles making it possible to avoid the collision between signals coming from different transponders sent to the interrogator.

A first anticollision principle which is relatively easy to implement consists of desynchronizing the transponders.

According to this principle, illustrated in FIG. 1, each transponder TR present in the detection field of an interrogator unit sends its identifier Id cyclically with pauses P of random duration. Each pause time P is the result of the multiplication between the identifier sending duration Di and a random number N. Each transponder TR therefore operates alternately in sending mode and pause mode.

Thus, the desynchronized sending of the transponders makes it possible to obtain one or more time slots in which a single transponder TR sends its identifier Id. As illustrated in FIG. 1, the cases in grey are situations where a number of transponders are sending at the same time and in that case none is correctly identified by the interrogator unit. In the other cases, a single transponder sends during a given time slot and can in that case be correctly identified.

A second anticollision principle, also easy to implement, is described in the patent cited above and illustrated in FIG. 2.

According to this second principle, the interrogator continuously sends an interrogation signal INT and the transponders TR each send an identification signal Id cyclically with random pauses P. The interrogator is also able to detect the message start frame S sent by a given transponder TR, and simultaneously modify its interrogation signal INT by a brief mute M.

This second principle consists of maintaining an anticollision channel open between the interrogator unit and a given transponder for at least the whole duration of the sending of the identification message Id. To that end, the interrogator unit is able to detect a message start frame S sent by a transponder TR and impose silence on the other transponders in order to continue reading the identifier Id of the detected transponder without interference due to the sending of a signal from another transponder.

The modification M in the interrogation signal INT is interpreted by the transponders in pause mode as a silence command whereas it is transparent for the transponder in the process of sending.

The transponder TR1 which has already sent a message start frame S then continues sending its identification signal Id, and the other transponders TRn are set into watching mode in order to extend their pause for a period D1 corresponding to the identifier sending duration Di multiplied by a random number N.

The modification of the interrogation signal making it possible to impose silence on the transponders in pause mode consists essentially of a mute of the signal of a few microseconds. This mute has the effect of reinitializing the counting of the pause time with a new random number N.

The anticollision principle described in this patent is reliable and easy to implement.

Nevertheless, the description which is given thereof allows this principle to be used only on transponders in read mode alone.

More precisely, such an anticollision principle does not make it possible to maintain the anticollision channel open between the interrogator unit and the transponder for carrying out a write operation or for execution of a command by the transponder.

The present invention seeks to overcome this drawback.

The aim of the present invention is consequently to propose maintaining an anticollision channel open between an interrogator and a transponder operating in read/write mode.

One object of the present invention is more particularly a system of communication between an interrogator unit and a plurality of transponders, whereby the interrogator unit is able to detect a start of sending from a transponder and then modify its interrogation signal so as to maintain the other transponders in a watching state, whereby the silent transponders are able to interpret the modification of the interrogation signal as an extended silence command, and the detected transponder is able to continue its sending despite the modification of the interrogation signal, characterised in that, after identification of the detected transponder, the interrogator unit, on the one hand, again modifies its interrogation signal so as to extend the watching state of the silent transponders and, on the other hand, sends a command to the identified transponder, the silent transponders again being able to interpret the modification of the interrogation signal as an extended silence request, and in that, at the end of sending its identifier, the detected transponder goes into listening mode for a given duration during which it is able to interpret and then execute the command sent by the interrogator unit.

According to another characteristic, each transponder has time counting means and means of reinitializing the time counting on receiving a modification of the interrogation signal.

According to another characteristic, the time counting means are able to determine a predetermined duration of listening of the detected transponder, during which said transponder sends no signal.

The communication system according to the present invention is also characterised in that, after the execution of a command, the identified transponder returns to listening mode for the predetermined duration in order to allow a new communication phase, a new modification of the interrogation signal reinitializing the watching state of the non-identified transponders, and a new command being sent by the interrogator unit, interpreted and executed by the identified transponder.

According to another characteristic, the identified transponder resumes the cyclic sending of its identifier after a random pause time in the case where no modification of the interrogation signal has occurred during the duration of listening.

According to another characteristic, the modification of the interrogation signal consists of a mute in the sending of the continuously sent interrogation signal.

According to another characteristic, the command sent by the interrogator unit comprises information to be read and/or written and/or executed by the identified transponder.

Another object of the present invention is a method of communication between an interrogator unit and a plurality of transponders comprising the following steps:

a—sending of a continuous interrogation signal by the interrogator unit;

b—sending of a message start frame by a transponder;

c—detection of this frame by the interrogator unit;

d—modification of the interrogation signal so as to set the silent transponders into a watching state for a duration D1 so as to prevent them sending their identification signal;

e—reading of the identification message by the interrogator unit;

the method being characterised in that it also has the following steps:

f—setting the identified transponder into listening mode;

g—modification of the interrogation signal so as to reinitialize the watching state of the silent transponders for a duration D2 so as to prevent them sending their identification signal;

h—sending of a command by the interrogator unit to the identified transponder;

i—execution of the command by the identified transponder;

j—sending of the reply from the transponder.

According to another characteristic, the communication method also comprises a plurality of supplementary steps, these supplementary steps consisting of returning the identified transponder to listening mode after the step j and of carrying out the operations g to j in a loop so as to perform a plurality of operations on the identified transponder.

According to another characteristic, the duration D2 is equal to the duration D1 added to the time for executing an operation, the duration D1 corresponding to the identifier sending duration multiplied by a random number.

The communication system with maintenance of an anticollision channel according to the invention has the advantage of making it possible to exchange information between an interrogator and a transponder in a manner which is reliable and easy to implement.

The system according to the invention makes it possible to use more advanced transponders requiring data transfers between the interrogator and the identified transponder such as for example the submission of keys (passwords, authentication, mutual recognition), the writing of information into the transponder (register update), the loading or updating of programs, or the reading of information from the transponder memory.

Other aspects and advantages of the invention will emerge in the remainder of the description with reference to the figures in which.

Figure 1:
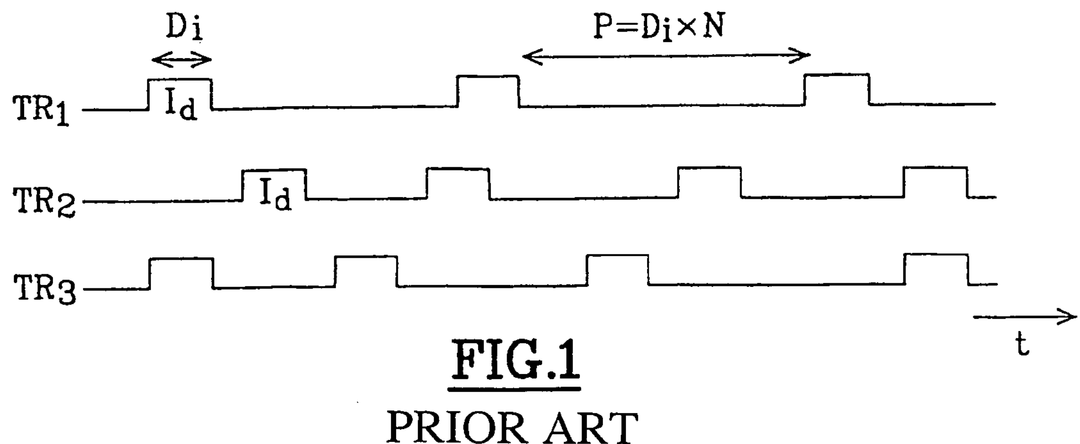
FIG. 1 is a diagram of the mode of operation of an anticollision system according to a first known principle of the state of the art.
Figure 2:
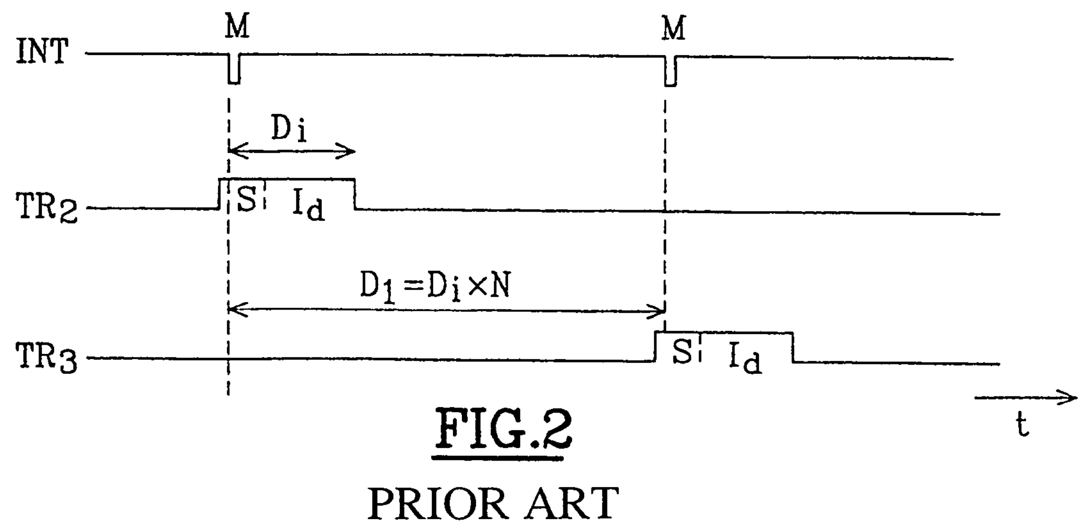
FIG. 2 is a diagram of the mode of operation of an anticollision system according to a second known principle of the state of the art.

FIGS. 1 and 2 have been described previously and depict principles for implementing known anticollision systems of the state of the art.

Figure 3:
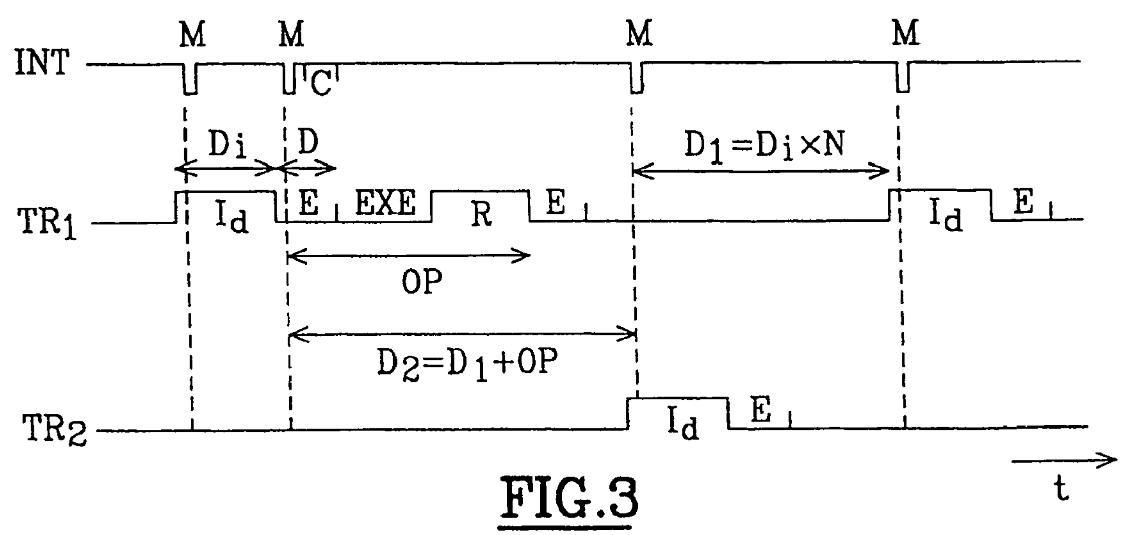
FIG. 3 is a diagram of the mode of operation of an anticollision system according to the present invention.

FIG. 3 depicts the implementation of the communication system according to the present invention with maintenance of an anticollision channel open between an interrogator unit and a transponder for reading/writing.

The implementation of the system according to the present invention breaks down into two distinct phases. The first step consists of an identification step, the implementation of which is already known and has previously been described during the description of FIG. 2.

The second step is a step for the carrying out of an operation OP by the identified transponder TR1 following a command C sent by the interrogator INT.

The transponder TR1 identified during the first step is placed in a listening mode E. If the interrogator unit INT has a command to transmit to this given transponder, it carries out a new modification M in the sending of its interrogation signal. This new modification M, a mute of a few microseconds for example, reinitializes the watching state of the other silent transponders for a period D2.

An anticollision channel thus being maintained open between an identified transponder TR1 and the interrogator unit, the latter can send a command C which will be interpreted by the transponder TR1 in listening mode E, and then executed EXE. The transponder next sends a signal R in reply to the execution of the commanded operation, and then returns to a listening mode E in order to receive, if applicable, a new command C.

If no new command is sent by the interrogator unit during the time in listening mode E of the identified transponder TR1, the latter will resume the cyclic sending of its identifier Id after a random pause time P.

The method of operation of the communication system according to the present invention thus allows an interrogator unit and a given transponder to converse for as long as necessary without risk of interruption by the sending of an identifier from another transponder.

The transponders used in the present invention are transponders having a memory which can be accessible for reading and for writing or for reading only. It is thus possible to read and/or write data contained in the transponder microcircuit memory.

According to a preferential embodiment of the invention, the interrogator unit sends an interrogation signal continuously with a power of around 1 watt and with an approximate frequency of 13.5 MHz for example.

The transponders used are well known by persons skilled in the art.

The transponders used in implementing the present invention have at least receiving and sending means, a memory, and an associated memory management module.

According to a variant embodiment, the transponders can be powered by the energy of the interrogation signal sent by the interrogator unit. They then modulate part of the received signal with a code generator in order to send their identification signal.

According to another variant, the transponders can have an independent power supply and generate their own identification signal.

The transponders can also use two distinct antennas for sending and receiving or one antenna only. A single antenna can also make it possible to generate the identification signal by modulating the reflectivity.

Advantageously, the transponders also have counting means in order to determine the pause times P, the watching state durations D1 and D2 and the listening durations D of the identified transponder. These counting means can consist of a circuit dividing the interrogator clock or a circuit comprising a resistor and a capacitor.

The interrogator unit is also well known by persons skilled in the art.

The interrogator unit comprises an amplifier for the messages coming from the transponders, a circuit for extracting the data processed in a microprocessor and a clock generator.

Figure 4:
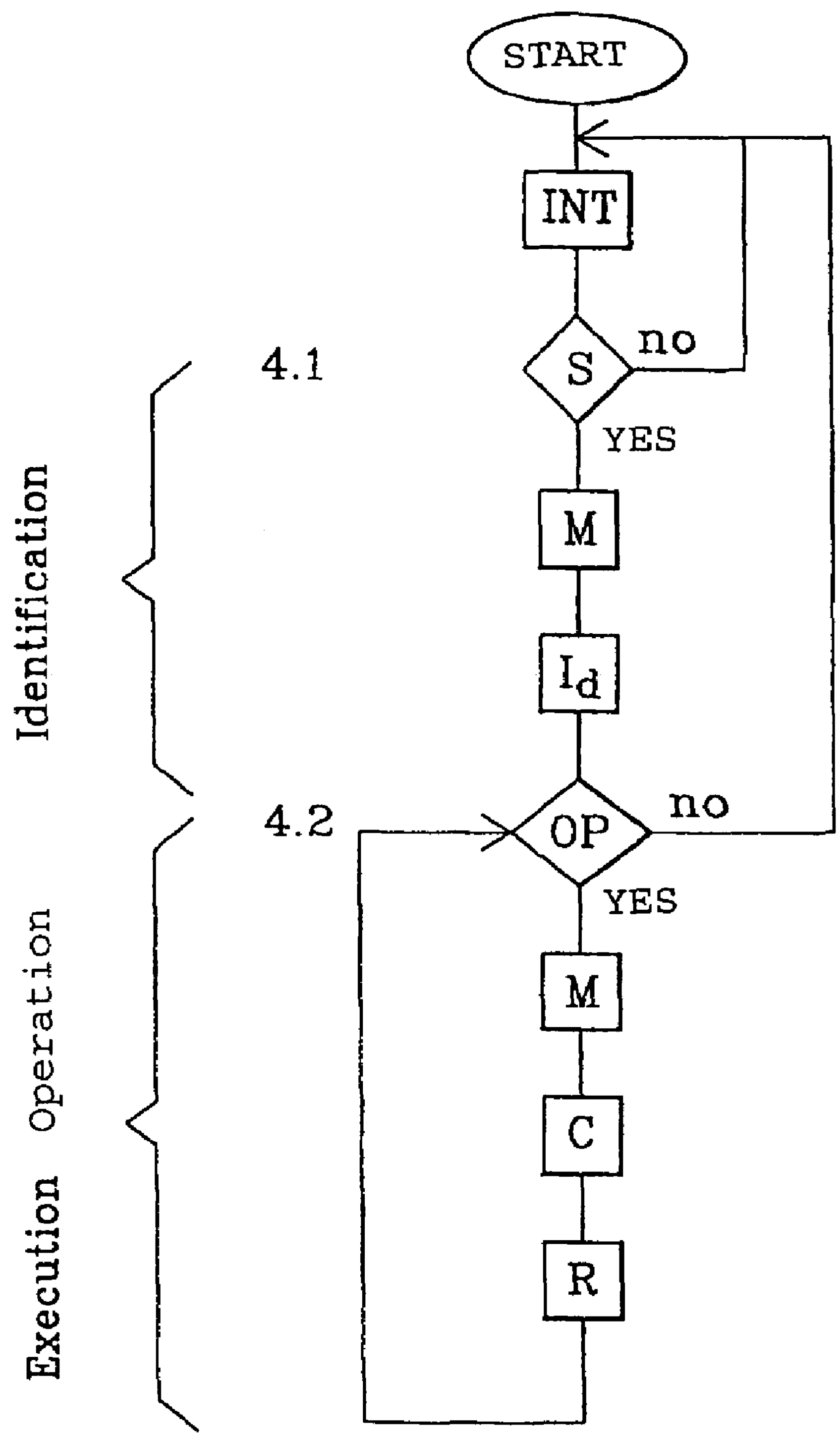
FIG. 4 is a diagram of the operations performed by the interrogator unit according to the invention.

FIG. 4 illustrates the different steps of the operations performed by the interrogator unit according to the present invention.

The interrogator unit sends an interrogation signal INT continuously as has already been indicated previously.

A first step (4.1) consists of identifying a transponder following the sending of a message start frame S.

Following the reception of this message start frame S, the interrogator unit carries out a modification M of its interrogation signal INT which will be interpreted as a silence command for the transponders in pause mode whereas it is transparent for the transponder in the process of sending.

The second step (4.2) starts if a particular operation OP has to be performed by the identified transponder. If applicable, the interrogator unit carries out a new modification M of its interrogation signal INT.

A command C is next sent by the interrogator unit, and then interpreted and executed by the identified transponder TR1.

The interrogator unit then awaits the reply R from the transponder. If another command has to be executed by this transponder TR1, the interrogator unit carries out a new modification M of its interrogation signal INT and sends the new command C for a new communication cycle (4.2).

Alternatively, the interrogator unit returns to a mode awaiting a message start frame S in order to repeat the identification operation with another transponder.

Figure 5:
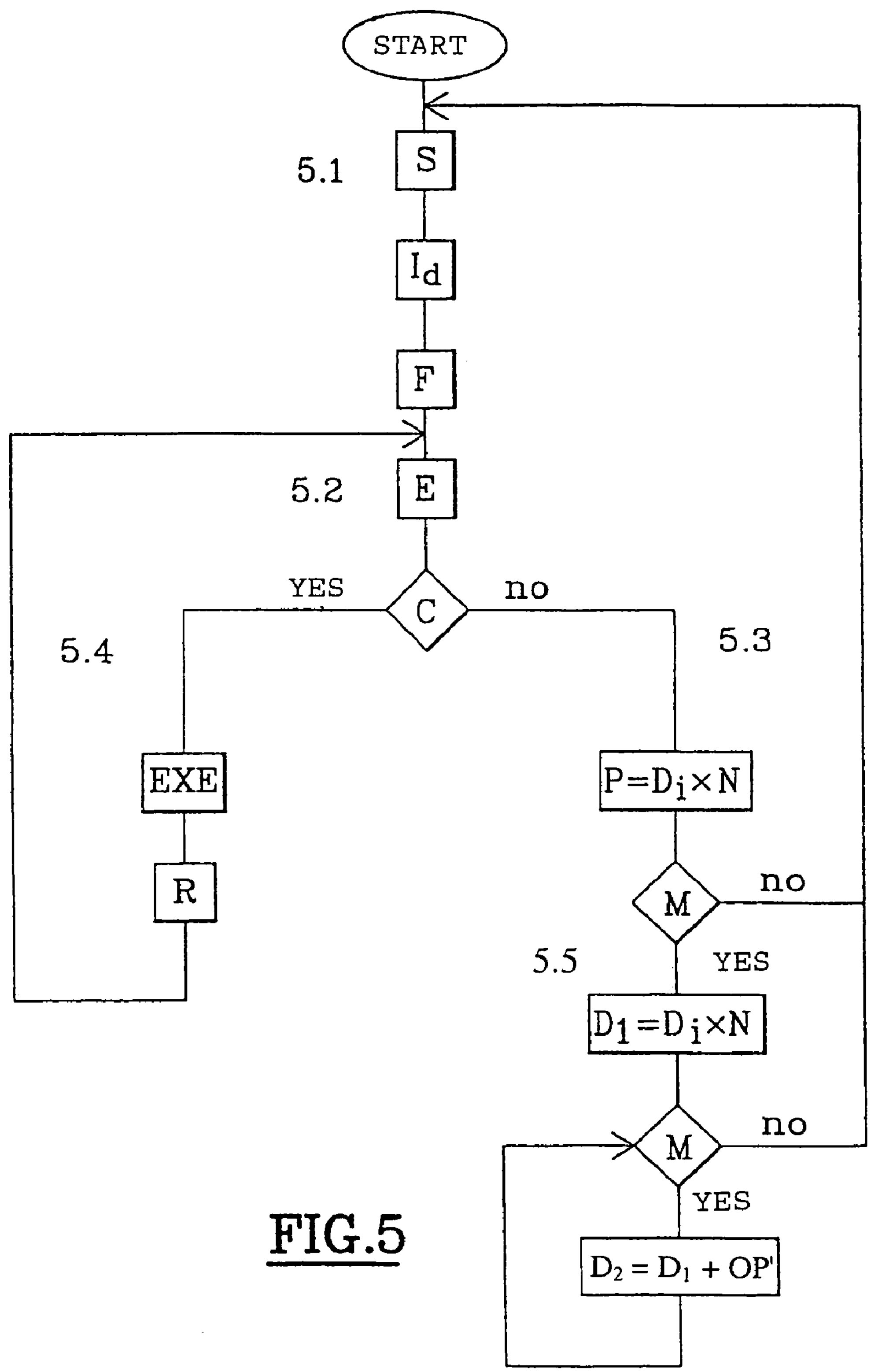
FIG. 5 is a diagram of the operations performed by a transponder according to the invention.

FIG. 5 illustrates schematically the different operations performed by a transponder according to the present invention.

According to a preferential embodiment, the transponder receives an interrogation signal INT which it converts by modulation into an identification signal Id sent cyclically over a duration Di with pause times P of random duration.

The first step (5.1) constitutes a step of identification by the interrogator unit.

Figure 6:
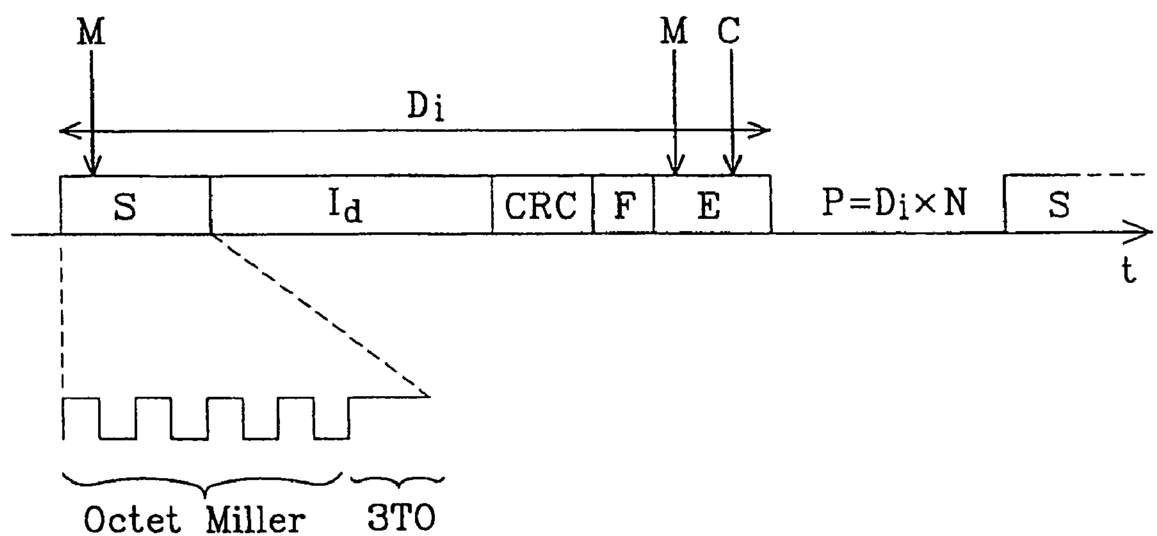
FIG. 6 is a sketch of the steps for the sending of a signal by a transponder according to the present invention.

FIG. 6 illustrates the steps in the sending of a signal by a transponder microcircuit.

The sending of the identification signal starts with a message start frame S. This frame is advantageously composed of a byte with a value of 0, coded according to the Miller principle, that is to say a byte composed of 8 successive changes of state. This byte makes it possible to signal, to the interrogator unit, the start of the sending of a message. This byte is followed by a violation code preceding the sending of the identification, said violation code having a duration of 3 bits with no change of state.

A modification M in the sending of the interrogation signal INT is commanded by the interrogator unit during the receiving of this message start frame S. The modification M takes place as quickly as possible after receiving and recognition of a message start frame S.

This modification M is transparent for the transponder in the process of sending whereas it is interpreted as a silence command by the other transponders.

The identification message Id is then sent, followed by a checksum CRC and an end of message information item F. This end of message information item is generally constituted by a stop bit at 0 or at 1 according to the convention adopted.

A second step (5.2) starts with a listening state E allowing the transponder to receive a command from the interrogator unit which differs from the interrogation signal. This listening state E is characterised by an active state of the transponder microcircuit with no signal sending.

If no command C occurs during the listening state E (step 5.3), the transponder will resume the cyclic sending of its identifier Id after a random pause time P.

In the contrary case (5.4), the command C sent by the interrogator unit is executed EXE by the transponder.

According to application, this command consists of an exchange of password, a writing or reading of information to/from the transponder microcircuit memory, or the loading or modification of a program contained in the transponder microcircuit memory.

The transponder next sends a suitable reply R, and then returns to listening mode E.

A number of operations can thus be executed by a given transponder as often as a command C occurs during the listening state E of the transponder TR1.

In parallel (5.5), the transponders in pause mode TRn at the time a message start frame S is sent by another transponder will pick up a first modification M in the interrogation signal INT and will delay the sending of their own identifier by watching, for a duration D1 equal to the identifier sending duration Di multiplied by a random number N.

The modification M of the interrogation signal INT occurs a few microseconds after detection of a message start frame S from a given transponder TR1, that is to say during the pause P of the other transponders TRn.

If a new modification of the signal M occurs during the watching duration D1 of the other transponders TRn, said transponders will reinitialize the counting of their watching state and will thus delay the sending of their identifier over a duration D2 equal to the duration D1 to which the duration for executing an operation OP is added.

This duration for executing an operation OP corresponds to the duration for execution of the command C by the transponder microcircuit plus the duration for sending a reply R from the transponder to the interrogator unit.

The restarting of the delay over a duration D2 can be repeated as often as necessary in order to maintain an anticollision channel open between the interrogator unit and a given transponder.

The invention claimed is:

1. A system of communication between an interrogator unit and a plurality of transponders, whereby the interrogator unit detects a start of sending signal from a transponder and then modifies its interrogation signal so as to maintain the other transponders in a watching state, whereby the silent transponders interpret the modification of the interrogation signal as an extended silence command, and the detected transponder continues its sending despite the modification of the interrogation signal, and wherein, after identification of the detected transponder, the interrogator unit, on the one hand, again modifies its interrogation signal so as to extend the watching state of the silent transponders and, sends a command to the identified transponder, the silent transponders again interpreting the modification of the interrogation signal as an extended silence request, and, at the end of sending its identifier, the detected transponder goes into a listening mode for a given duration during which it interprets and then executes the command sent by the interrogator unit.

2. A communication system according to claim 1, wherein each transponder has time counting means and means of reinitializing the time counting on receiving a modification of the interrogation signal.

3. A communication system according to claim 2, wherein the time counting means determine a predetermined duration of listening of the detected transponder, during which said transponder sends no signal.

4. A communication system according to claim 1, wherein, after the execution of a command, the identified transponder returns to the listening mode for the predetermined duration in order to allow a new communication phase, with a new modification of the interrogation signal reinitializing the watching state of the non-identified transponders, and a new command being sent by the interrogator unit, interpreted and executed by the identified transponder.

5. A communication system according to claim 1 or claim 4, wherein the identified transponder resumes the cyclic sending of its identifier after a random pause time in the case where no modification of the interrogation signal has occurred during the duration of the listening mode.

6. A communication system according to claim 1, wherein the modification of the interrogation signal consists of a mute in the sending of the continuously sent interrogation signal.

7. A communication system according to claim 1, wherein the command sent by the interrogator unit comprises information to be read and/or written and/or executed by the identified transponder.

8. A method of communication between an interrogator unit and a plurality of transponders comprising the following steps:

a—sending a continuous interrogation signal by the interrogator unit;

b—sending a message start frame by a transponder;

c—detection of said frame by the interrogator unit;

d—modification of the interrogation signal so as to set the silent transponders into a watching state for a first duration so as to prevent them from sending their identification signal;

e—reading of the identification message by the interrogator unit;

f—setting the identified transponder into a listening mode;

g—modification of the interrogation signal so as to reinitialize the watching state of the silent transponders for a second duration so as to prevent them from sending their identification signal;

h—sending of a command by the interrogator unit to the identified transponder;

i—execution of the command by the identified transponder; and j—sending of a reply from the identified transponder.

9. A communication method according to claim 8, further comprising a plurality of supplementary steps, said supplementary steps comprising returning the identified transponder to the listening mode after the step j and carrying out the operations g to j in a loop so as to perform a plurality of operations on the identified transponder.

10. A communication method according to claim 8, wherein the second duration is equal to the first duration added to the time for executing an operation, and the first duration corresponds to an identifier sending duration multiplied by a random number.

11. An electronic identification system, comprising:

an interrogator unit that transmits an interrogation signal and, upon detecting the start of an identification signal from a transponder, produces a first modification of said interrogation signal and, upon detecting completion of said identification signal from said transponder, produces a second modification of said interrogation signal and, subsequent to said second modification signal, transmits a command different from said interrogation signal, to be executed by said transponder; and a plurality of transponders, each of which is responsive to receipt of said interrogation signal to transmit an identification signal associated with that transponder and enter a listening state for a predetermined period upon completion of transmitting said identification signal, and is responsive to receipt of a command during said predetermined period to execute said command, and each of which is further responsive to detection of either of said modifications to enter a silent state for a period of time.

12. The identification system of claim 11 wherein, upon execution of said command, the transponder transmits a response and again enters the listening state for a predetermined period.

13. The identification system of claim 12 wherein, upon detecting said response, said interrogator unit produces another modification of said interrogation signal if a further command is to be transmitted to said transponder.

14. The identification system of claim 11 wherein, upon detection of said first modification, said transponders enter said silent state for a first period of time, and upon detection of said second modification, said transponders enter said silent state for a second period of time longer than said first period of time.

15. The identification system of claim 14, wherein said second period of time is equal to said first period of time plus a length of time associated with the execution of a command.

16. The identification system of claim 14, wherein said first period of time comprises a length of time associated with the transmission of the identification signal, multiplied by a random number.

17. The identification system of claim 14 wherein, upon termination of said listening state, said transponder enters said silent state for said first period of time if no command was received during said listening state.

18. The identification system of claim 11, wherein said modifications each comprise an interruption in the transmission of the interrogation signal.

* * * * *